(12) United States Patent
Milne

(10) Patent No.: US 6,736,969 B2
(45) Date of Patent: May 18, 2004

(54) PAINT BUCKET STRAINER

(76) Inventor: Richard B. Milne, 3538 West 360 North, Hurrican, UT (US) 84737

( * ) Notice: Subject to any disclaimer, the term of this patent is extended or adjusted under 35 U.S.C. 154(b) by 114 days.

(21) Appl. No.: 10/194,555

(22) Filed: Jul. 13, 2002

(65) Prior Publication Data

US 2004/0007514 A1 Jan. 15, 2004

(51) Int. Cl.[7] ...................... B01D 29/03; B01D 35/027; B01D 35/28
(52) U.S. Cl. ...................... 210/232; 210/473; 210/499; 220/501; 220/502; 220/694; 220/700
(58) Field of Search ................. 210/232, 473, 210/499; 220/501, 502, 694, 700

(56) References Cited

U.S. PATENT DOCUMENTS

| 1,051,735 | A |   | 1/1913  | Hammond |           |
|-----------|---|---|---------|---------|-----------|
| 1,111,159 | A | * | 9/1914  | Knox    | 220/527   |
| 1,451,206 | A |   | 4/1923  | Dow     |           |
| 1,590,572 | A |   | 6/1926  | Fredette|           |
| 1,848,331 | A | * | 3/1932  | Esslinger | 220/553 |
| 2,070,998 | A |   | 2/1937  | Odom    | 210/149   |
| 2,250,646 | A |   | 7/1941  | Metsch  | 210/159   |
| 2,436,924 | A | * | 3/1948  | Hansen  | 211/65    |
| 2,625,270 | A |   | 1/1953  | De Armas| 210/155   |
| 3,301,404 | A |   | 1/1967  | Becker  | 210/465   |
| 4,145,789 | A | * | 3/1979  | Morgan, Sr. | 15/257.06 |
| D264,147  | S | * | 5/1982  | Heath   | D32/54    |
| 4,756,046 | A | * | 7/1988  | Surface et al. | 15/257.06 |
| 4,804,470 | A |   | 2/1989  | Calvillo et al. | 210/232 |
| 4,946,591 | A |   | 8/1990  | Mealey  | 210/474   |
| 5,059,319 | A | * | 10/1991 | Welsh   | 210/232   |
| 5,283,928 | A | * | 2/1994  | Linn et al. | 15/257.06 |
| 5,368,728 | A |   | 11/1994 | Reaves  | 210/232   |
| 6,149,808 | A |   | 11/2000 | Johnson et al. | 210/242.1 |
| 6,247,600 | B1|   | 6/2001  | Sullivan, Jr. | 210/474 |

* cited by examiner

Primary Examiner—Thomas M. Lithgow
(74) Attorney, Agent, or Firm—J. David Nelson

(57) ABSTRACT

A paint strainer dimensioned to fit in a vertical position in a paint bucket, in a vertical plane passing through the center of the paint bucket, dividing the paint bucket into a receiving side and a strained paint side. The paint strainer has a strainer frame around the perimeter of the paint strainer which defines the bottom sides and top of the paint strainer, and has a paint screen which is secured and sealed to the strainer frame. A pair of bucket top brackets, one affixed to the top of each side of the strainer frame, secures the paint strainer to the paint bucket.

12 Claims, 3 Drawing Sheets

PAINT BUCKET STRAINER

FIELD OF THE INVENTION

This invention is in the field of devices for removing solids from paint and in particular in the field of devices for straining solids from paint that would hinder the use of a paint sprayer.

BACKGROUND OF THE INVENTION

At the time of manufacture, the pigment and other non-solvent constituents of paint, as well as contaminants, are typically in solution or suspended with a small particle size. As the paint subsequently sits in bulk storage containers and buckets in which the paint is distributed and sold, some of the solids tend to aggregate and settle out. A skim of solids may also form on the top of the paint. Attempts to break down these clumps into a small particle size and to re-suspend the solids through shaking the paint at the time of sale is usually not entirely successful. Furthermore, the paint may sit for days or longer after sale resulting in the aggregation or re-aggregation of more clumps. Attempts to break down the clumps and re-suspend the solids at the time of use by stirring or hand shaking also leads to a limited success. The result is that, at the time of use, paint usually will have clumps and other solids that will clog the intake screen of a paint sprayer, thereby resulting in lost time and lost productivity in the painting process.

A number of devices have been developed to deal with this problem, with varying degrees of success. Some of the prior art devices provide for screening of the paint as it is poured into the top of a receiving bucket. These devices are generally positioned on or affixed to the top rim of the receiving bucket. Each of these devices has a straining surface or screen which may range in configuration from a flat screen extending across the top of the receiving bucket, such as is disclosed in U.S. Pat. No. 5,059,319 to Welsh, or a bag shaped screen extending downwardly below the top of the straining device or below the top of the receiving bucket such as that disclosed in U.S. Pat. No. 6,247,600 B1 to Sullivan, U.S. Pat. No. 5,368,728 to Reaves, U.S. Pat. No. 5,186,828 to Mankin, U.S. Pat. No. 4,946,591 to Mealey, U.S. Pat. No. 4,804,470 to Calvillo et al., U.S. Pat. No. 2,250,646 to Metsch, U.S. Pat. No. 2,070,998 to Odom, U.S. Pat. No. 1,451,206 to Dow, U.S. Pat. No. 1,051,735 to Hammond, and U.S. Design Pat. No. 410,123 to Matarazzo et. al.

U.S. Pat. No. 1,590,572 to Fredette discloses a strainer cup for use with varnish.

U.S. Pat. No. 3,301,404 to Becker discloses a strainer that is held against the top of a paint bucket as it is tipped. The paint is poured from the bucket through the strainer into a receiving bucket, thereby straining out the solids.

U.S. Pat. No. 5,935,435 to Hasler and U.S. Pat. No. 6,149,808 to Johnson disclose cylindrical or cup shape strainers for inserting in a bucket of paint, providing for the straining of solids from the paint as it flows inwardly through the cylindrical strainer into the interior space of the strainer. The Hasler device provides for the pouring of paint from the interior of the cylinder. The Johnson device merely provides for the insertion of a brush or other painting implement into the interior of the cylinder where the strained paint is available.

While each of the foregoing devices achieves the principal objective, namely to remove unwanted solids from the paint, with some degree of success, each has some significant deficiencies. Each of the devices using a flat horizontal strainer affixed at the top of a receiving bucket or a bag shaped strainer mounted above or extending into the receiving bucket are mainly designed for batch use. That is, they are mounted on a receiving bucket, paint is poured in through the strainer into the receiving bucket and then the strainer is removed. The straining device must then be cleaned to prevent the paint from drying in place and stored for re-use, unless the strainer is intended for disposal after only one use. While the device disclosed by Sullivan does provide for a paint sprayer intake to be inserted into the reservoir of strained paint, with the strainer device remaining in place considerable strainer area is still exposed to drying as the paint is drawn down. The remaining devices disclosed by the patents identified above appear very ill suited for a continuous paint spraying operation. Further, these devices are generally expensive, cumbersome and time consuming to use. Most of them, from a practical standpoint, require either that they be disposable or that messy cleaning effort be made repeatedly to allow re-use of the screen. The devices providing for straining into an interior cup or cylinder shape strainer are particularly poorly suited for use with a continuous paint spraying operation.

A device is needed that provides for the reliable, economical and non-disruptive straining of paint that is readily compatible with a continuous paint spraying operation.

It is an objective of the present invention to provide a paint strainer that will provide for continuous straining of paint for a paint spraying operation.

It is a further objective of the present invention to provide a paint strainer which is economical.

It is a still further objective of the present invention to provide a paint strainer which is specifically designed for use with paint buckets which are commonly used by manufacturers for distributing and selling paint.

It is a still further objective of the present invention to provide a paint strainer which does not require frequent cleaning.

It is a still further objective of the present invention to provide a paint strainer that is easy to clean.

It is a still further objective of the present invention to provide a paint strainer which strains the paint as the paint flows from one side of the bucket to the other horizontally through the paint strainer.

SUMMARY OF THE INVENTION

The present invention is a paint strainer dimensioned to fit in a paint bucket, in a vertical position, snugly against the bottom and opposing sides of the paint bucket. The paint strainer fits in a vertical plane which passes through the center of the paint bucket, dividing the paint bucket into a receiving side and a strained paint side. The paint strainer has a strainer frame around the perimeter of the paint strainer which defines the bottom, sides and top of the paint strainer, and has a paint screen which is secured and sealed to the strainer frame. A pair of bucket top brackets, one affixed to the top of each side of the strainer frame, secures the paint strainer to the paint bucket.

Once the paint strainer is inserted into the paint bucket and secured in place by the bucket top brackets, paint is poured into the receiving side of the paint bucket and the paint flows through the paint strainer into the strained paint side of the paint bucket. This can continue until the paint bucket is full, with unstrained paint on the receiving side of the paint strainer and strained paint on the strained paint side of the paint strainer. A paint sprayer intake tube can then be inserted into the strained paint side for spray painting. As the paint on the strained paint side is drawn down, paint continues to flow from the receiving side through the paint strainer to the strained paint side. With periodic replenishment of the paint on the receiving side, the paint spraying operation can proceed more or less continuously, ordinarily without the necessity of removing and cleaning the paint strainer until the paint spraying operation is finished for the day.

DETAILED DESCRIPTION OF PREFERRED EMBODIMENTS

Figure 1:
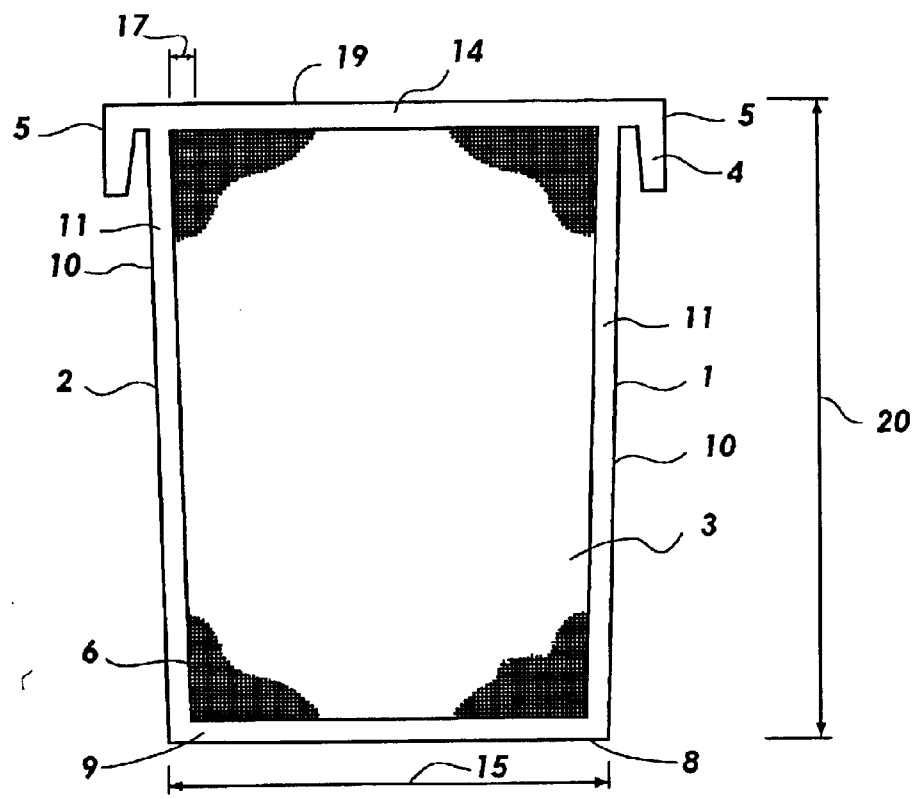
FIG. 1 is an elevation view of a preferred embodiment of the paint strainer of the present invention.

Referring to FIG. 1, a preferred embodiment of the paint strainer 1 of the present invention is comprised of a strainer frame 2, paint screen 3 and an attachment means 4 for attaching the paint strainer to a paint bucket. The attachment means shown in FIG. 1, which is a preferred means for attaching the paint strainer to a five gallon standard paint bucket, is comprised of a pair of bucket top brackets 5. The perimeter 6 of the paint screen is secured to the strainer frame at all points to prevent unstrained paint from passing through the paint strainer.

Figure 2:
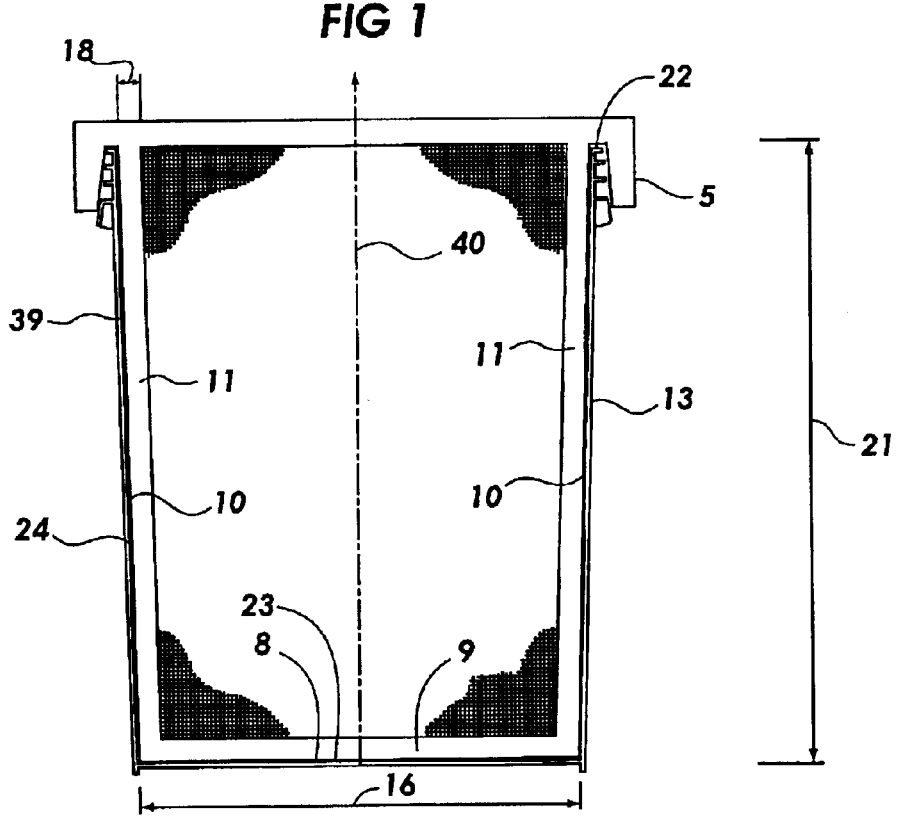
FIG. 2 is a cross section view of a preferred embodiment of the paint strainer of the present invention inserted in a typical paint bucket.
Figure 3:
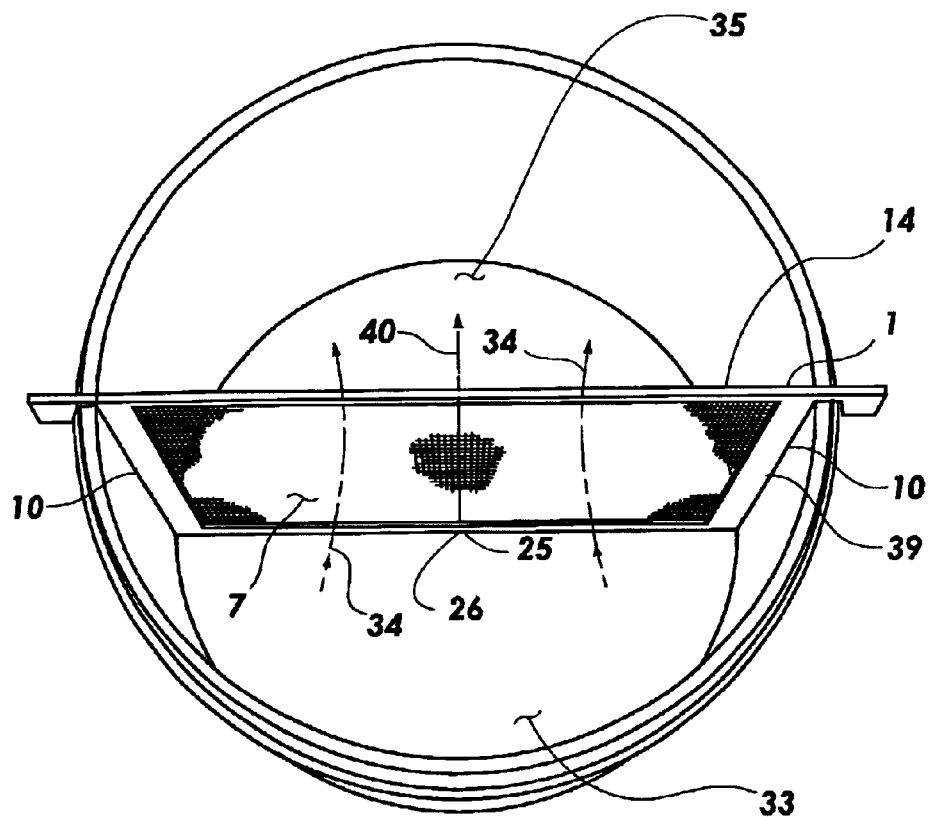
FIG. 3 is a top perspective view of a preferred embodiment of the paint strainer of the present invention inserted in a typical paint bucket.

The strainer frame can be made from common economical materials such as aluminum, fiberglass or plastic. Although light weight materials are preferred, heavier materials such as steel provide the advantage of reducing the buoyancy of the paint strainer, making it easier to keep the paint strainer in place as it is being used to strain the paint. Likewise, the paint screen may be made from any of the common economical materials such as fiberglass or aluminum mesh. Depending upon the materials used for the strainer frame and the paint screen, the paint screen can be secured and sealed to the strainer frame by gluing, chemical or heat bonding, welding, riveting or other commonly used attaching means. A flat or planar configuration of the paint strainer as shown in FIGS. 1, 2 and 3 is preferred. However, referring to FIG. 3, the surface area of the screen can be increased somewhat by providing a paint screen which is convex or concave as to the receiving side 7 of the paint strainer.

Referring again to FIG. 1, a gasket or seal may also be used on the bottom 8 of the strainer frame bottom member 9 and on the outside edge 10 of the strainer frame side members 11 to improve the seal against unstrained paint escaping from the receiving side to the strained side of the paint strainer and for improving the ease at which the paint strainer can be secured in place by pressing the bucket top brackets onto the paint bucket top 22, as shown in FIG. 2. However, in the interest of economy and simplicity, embodiments of the paint strainer without a gasket or seal as shown in FIGS. 1–3, can be used very effectively.

Referring to FIG. 2, the paint strainer embodiment of the present invention that is shown in FIG. 1 is shown inserted in a typical five gallon paint bucket 13. The five gallon paint bucket is the most popular size for use by professional painters and the design and dimensions of the five gallon buckets used by the various paint manufacturers are relatively standardized.

Referring again to FIG. 1, for preferred embodiments of the paint strainer for use with a standard five gallon paint bucket, the strainer frame will be in trapezoidal shape, having a strainer frame bottom member 9, a pair of identical strainer frame side members 11, and a strainer frame top member 14. The bottom member length 15 will be equal to or slightly less than the paint bucket bottom inside diameter 16 as shown on FIG. 2. The side member slope 17 from vertical as shown in FIG. 1 will be equal to the bucket side slope 18 as shown in FIG. 2. The strainer height 20 from the bottom 8 of the strainer frame bottom member 9 to the top 19 of the strainer frame top member 14 is somewhat larger than the paint bucket depth 21 as shown in FIG. 2 to allow the bucket top brackets to be inserted on the paint bucket top 22 and pressured into place, with the bottom of the strainer frame bottom member and the outside edge of the strainer frame side members being flush with the inside bottom 23 and side 24 respectively of the paint bucket as shown in FIG. 2.

Referring again to FIG. 3, which is a top view of a paint bucket with the paint strainer of the present invention inserted. Since the length of the strainer frame bottom member is equal to or just slightly less than the bottom inside diameter of the paint bucket, the strainer frame bottom member mid point 25 is positioned immediately over the paint bucket bottom center 26.

Figure 4:
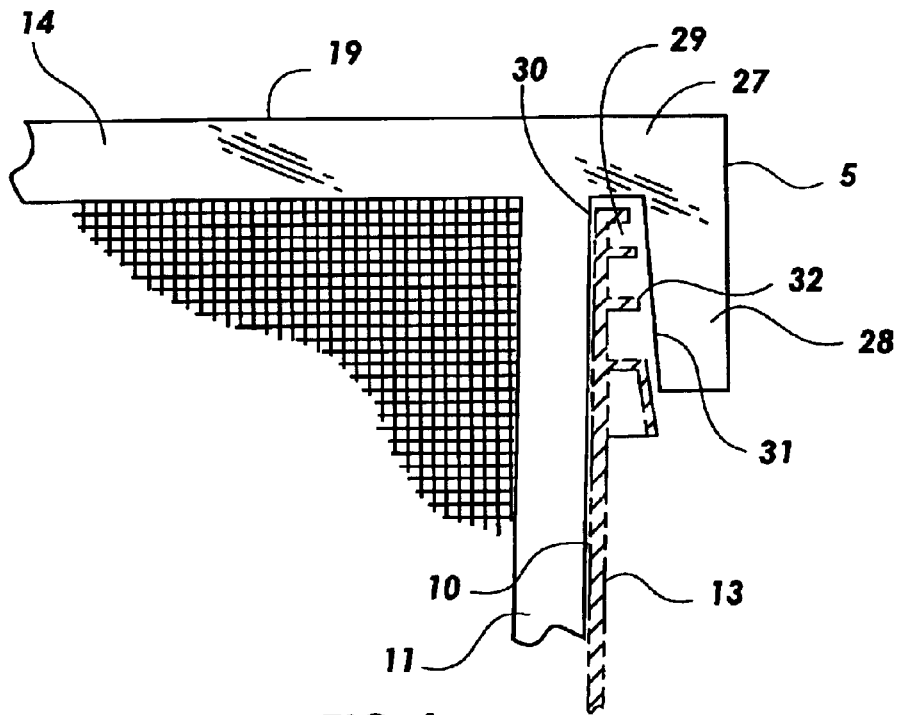
FIG. 4 is an elevation detail of an embodiment of the bucket top attachment means of the present invention for use with a typical five gallon paint bucket.

Referring now to FIG. 4, a detail of a preferred embodiment of the attachment means, namely the bucket top bracket 5 is shown. Each bucket top bracket has a top bracket member 27 and an outside bracket member 28. The attachment space 29 between the top 30 of the outside edge of the strainer frame side member and the outside bracket member is dimensioned to provide for the bracket inside surface 31 fit snugly against the bucket top outside surface 32. The attachment space can be varied to allow for some variation between paint buckets that are used.

Referring again to FIG. 3 and FIG. 1, once the paint strainer is inserted in a vertical plane 39 which passes through the center 40 of the paint bucket and secured in place with the bottom and sides of the paint strainer snug against the paint bucket, paint can be poured into a receiving side 33 of the paint bucket and the paint will then flow 34 from the receiving side through the paint strainer into the strained paint side 35 of the paint bucket. Paint can be poured into the receiving side until the paint bucket is full, the paint on the receiving side being unstrained and the paint on the strained paint side being strained. A paint sprayer intake hose can then be inserted into the strained paint side for use in painting. As the paint is drawn down, additional paint can be poured into the receiving side as frequently as it is needed or desired to provide a continuous source of strained paint for a continuous paint spraying operation. As paint is withdrawn from the strained paint side in a paint spraying operation, paint flows horizontally through the paint strainer from the receiving side to the strained paint side.

Figure 5:
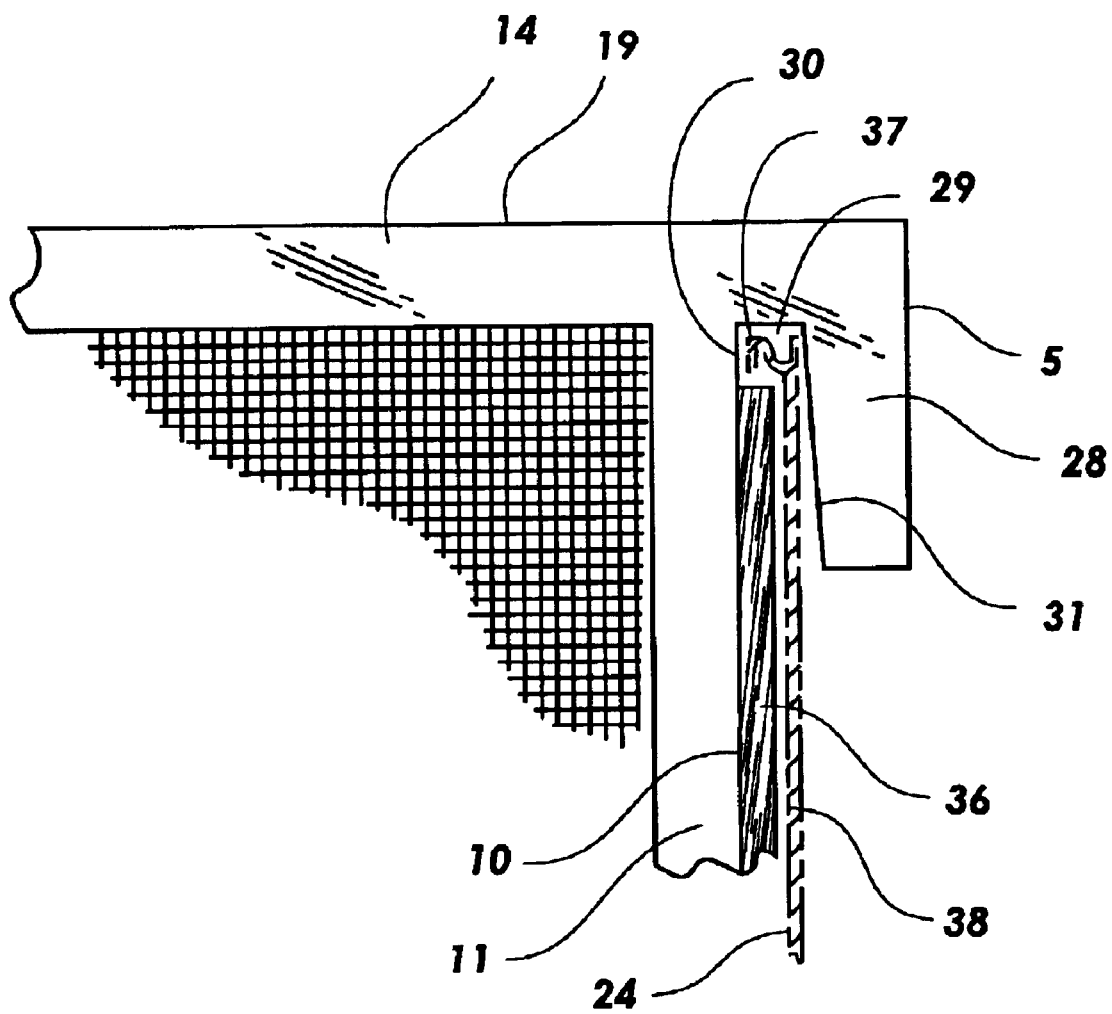
FIG. 5 is an elevation detail of an embodiment of the bucket top attachment means and frame gasket of the present invention for use with a typical one gallon paint bucket.

Referring now to FIG. 5, a further embodiment of a bucket top bracket 5 for use with a typical one gallon paint bucket 38 is shown. For this embodiment, because the lip 37 of the bucket top extends inward from the side 24 of the paint bucket, a resilient frame gasket 36 is attached to the outside edge 10 of the strainer frame side members 11. For this embodiment, the frame gasket must be of a type that can be compressed or deformed enough to allow the frame gasket to pass the lip of the bucket top as the paint strainer is inserted into the bucket.

As indicated above, the embodiment of the paint strainer of the present invention shown in FIGS. 1, 2, 3 and 4 is for use with a typical manufactured paint bucket, particularly a typical five gallon paint bucket. However, so long as the diameter of the paint bucket is uniform from bottom to top or the diameter of the bucket increases uniformly with height above the bottom of the bucket, the embodiment shown in FIGS. 1, 2, 3 and 4 will work. The attachment means shown in FIG. 5 is particularly well suited for a typical one gallon paint bucket. An embodiment similar to that shown in FIG. 5, without resilient frame gaskets, with the strainer frame side members and the strainer frame bottom member conforming to the sides and bottom of the paint bucket respectively, may also be used with a typical one gallon paint bucket. However, this embodiment requires that the strainer frame and the paint screen be somewhat flexible as some deformation is required in order to insert the paint strainer in the can.

Certain embodiments of the paint strainer of the present invention also have a strainer frame without a top frame member. Depending primarily on the materials used, the necessary stability of the paint strainer can be obtained without a top frame member.

Other embodiments of the invention and other variations and modifications of the embodiments described above will be obvious to a person skilled in the art. Therefore, the foregoing is intended to be merely illustrative of the invention and the invention is limited only by the following claims.

What is claimed is:

1. Paint strainer for insertion vertically in a paint bucket, dividing the paint bucket into a receiving side and a strained paint side, the paint strainer comprising:
   a) strainer frame dimensioned to conform to the bottom and sides of the inside of the paint bucket as the paint strainer is inserted in the paint bucket in a vertical plane passing through the center of the paint bucket; and
   b) paint screen, the paint screen being secured to and sealed to the strainer frame.

2. Paint strainer as recited in claim 1 further comprising attachment means for securing the paint strainer to the paint bucket.

3. Paint strainer as recited in claim 2 wherein the attachment means comprises a pair of bucket top brackets, one of the bucket top brackets being affixed to the top of each side of the strainer frame.

4. Paint strainer as recited in claim 1 further comprising a frame gasket attached to the bottom of the strainer frame and to the outside edge of each side of the strainer frame.

5. A flat, trapezoidal shaped paint strainer for insertion vertically in a paint bucket, dividing the paint bucket into a receiving side and a strained paint side, the paint strainer comprising:
   a) flat, trapezoidal shaped strainer frame, the length of the bottom of the strainer frame being equal to or slightly less than the bottom inside diameter of the paint bucket, and the width of the strainer frame at any height above the bottom of the strainer frame being equal to or slightly less than the inside diameter of the paint bucket at the same height above the inside bottom of the paint bucket, thereby providing for the bottom and sides of the strainer frame to fit snugly against the inside of the paint bucket when it is inserted in the paint bucket;
   b) paint screen, the perimeter of the paint screen being secured to and sealed to the strainer frame; and
   c) attachment means for securing the paint strainer to the paint bucket.

6. Paint strainer as recited in claim 5 wherein the attachment means comprises a pair of bucket top brackets, one of the bucket top brackets being affixed to the top of each side of the strainer frame.

7. Paint strainer as recited in claim 5 further comprising a frame gasket attached to the bottom of the strainer frame and to the outside edge of the each side of the strainer frame.

8. A flat, trapezoidal shaped paint strainer for insertion vertically in a paint bucket in a vertical plane passing through the center of the paint bucket and dividing the paint bucket into a receiving side and a strained paint side, the paint strainer comprising:
   a) strainer frame having opposing sides defined by opposing strainer frame side members which are connected by a strainer frame bottom member which defines the bottom of the strainer, the width of the strainer frame at the bottom of the strainer frame and at any height above the bottom of the strainer frame being equal to or slightly less than the inside diameter of the paint bucket at the same height above the inside bottom of the paint bucket;
   b) paint screen, the perimeter of the paint screen being secured to and sealed to the strainer frame; and
   c) attachment means for securing the paint strainer to the paint bucket.

9. Paint strainer as recited in claim 8 wherein the attachment means comprises a pair of bucket top brackets, one of the bucket top brackets being affixed to the top of each side of the strainer frame.

10. Paint strainer as recited in claim 8 further comprising a frame gasket attached to the bottom of the strainer frame bottom member and to the outside edge of each of the strainer frame side members.

11. Paint strainer for insertion vertically in a paint bucket, the paint bucket having a lip extending inwardly from the top of the paint bucket, the paint strainer dividing the paint bucket into a receiving side and a strained paint side, the paint strainer comprising:
   a) strainer frame with a frame gasket attached to the sides of the strainer frame, the strainer frame with frame gasket attached thereto being dimensioned to allow insertion of the strainer frame past the lip of the paint bucket by compression of the frame gasket and the strainer frame with frame gasket attached thereto being dimensioned to conform to bottom and sides of the paint bucket as the paint strainer is inserted in the paint bucket in a vertical plane passing through the center of the paint bucket;
   b) paint screen, the paint screen being secured to and sealed to the strainer frame; and
   c) attachment means for securing the paint strainer to the paint bucket.

12. Paint strainer as recited in claim 11 wherein the attachment means comprises a pair of bucket top brackets, one of the bucket top brackets being affixed to the top of each side of the strainer frame.

* * * * *